(12) United States Patent
Lin et al.

(10) Patent No.: US 9,356,532 B2
(45) Date of Patent: May 31, 2016

(54) LOAD DRIVER AND LUMINAIRE INCLUDING THE LOAD DRIVER

(71) Applicant: OSRAM GmbH, Munich (DE)

(72) Inventors: Daxin Lin, Shenzhen Guangdong (CN); Hui Jia, Shenzhen Guangdong (CN); Yaping Liu, Shenzhen Guangdong (CN); SiXiong Zeng, Shenzhen Guangdong (CN); Middel Tjaco, Shenzhen Guangdong (CN); Xuewei Dai, Shenzhen Guangdong (CN); Yewei Liufu, Shenzhen Guangdong (CN)

(73) Assignee: OSRAM GMBH, Munich (DE)

( * ) Notice: Subject to any disclaimer, the term of this patent is extended or adjusted under 35 U.S.C. 154(b) by 0 days.

(21) Appl. No.: 14/403,196

(22) PCT Filed: May 23, 2013

(86) PCT No.: PCT/EP2013/060623
§ 371 (c)(1),
(2) Date: Nov. 24, 2014

(87) PCT Pub. No.: WO2013/174924
PCT Pub. Date: Nov. 28, 2013

(65) Prior Publication Data
US 2015/0097493 A1    Apr. 9, 2015

(30) Foreign Application Priority Data
May 25, 2012 (CN) .......................... 2012 1 0167509

(51) Int. Cl.
| | |
|---|---|
| *H05B 37/02* | (2006.01) |
| *H02M 5/293* | (2006.01) |
| *H02H 9/04* | (2006.01) |
| *H05B 33/08* | (2006.01) |
| *H02M 1/08* | (2006.01) |
| *H02M 7/06* | (2006.01) |

(52) U.S. Cl.
CPC .............. *H02M 5/293* (2013.01); *H02H 9/041* (2013.01); *H02M 1/081* (2013.01); *H02M 7/06* (2013.01); *H05B 33/0809* (2013.01); *H05B 33/0815* (2013.01); *H02M 2005/2932* (2013.01)

(58) Field of Classification Search
CPC ........... H05B 33/0815; H05B 33/0818; H05B 37/029; H05B 37/02; H05B 41/3925; H05B 41/391; H05B 41/2828; H05B 33/0803
USPC .................. 315/291, 294, 224, 201, 307, 193
See application file for complete search history.

(56) References Cited

U.S. PATENT DOCUMENTS

2011/0121774 A1 * 5/2011 Shimada ............. H02M 1/4233
                                                               318/729

(Continued)

FOREIGN PATENT DOCUMENTS

| CA | 1230919 | 12/1987 |
|---|---|---|
| JP | 2000166254 A | 6/2000 |

OTHER PUBLICATIONS

International Search Report dated Sep. 11, 2013.

*Primary Examiner* — Douglas W Owens
*Assistant Examiner* — Syed M Kaiser
(74) *Attorney, Agent, or Firm* — Viering, Jentschura & Partner MBB

(57) ABSTRACT

Various embodiments relate to a load driver and a luminaire including the load driver. The load driver may include a voltage limiting circuit including a first polar capacitor and a second polar capacitor connected in inverse series, which are connected in parallel respectively with first and second current limiting elements, where the first and second current limiting elements limit the direction in which current flows so that current flows through different polar capacitors in positive and negative halves of a cycle of an alternating-current power supply.

7 Claims, 4 Drawing Sheets

(56) References Cited

U.S. PATENT DOCUMENTS

| | | | | |
|---|---|---|---|---|
| 2012/0249003 A1* | 10/2012 | Esaki | .................. | H05B 33/086 315/201 |
| 2013/0010507 A1* | 1/2013 | Kitahara | .............. | H02H 7/1227 363/56.03 |
| 2014/0320004 A1* | 10/2014 | Roberts | ................... | H01J 61/56 315/34 |

* cited by examiner

US 9,356,532 B2

LOAD DRIVER AND LUMINAIRE INCLUDING THE LOAD DRIVER

RELATED APPLICATIONS

The present application is a national stage entry according to 35 U.S.C. §371 of PCT application No.: PCT/EP2013/060623 filed on May 23, 2013, which claims priority from Chinese application No.: 201210167509.6 filed on May 25, 2012, and is incorporated herein by reference in its entirety.

TECHNICAL FIELD

Various embodiments relate to a load driver coupled with an alternating-current power supply and a luminaire using the load driver.

BACKGROUND

Typically an LED driver is designed in a BUCK or Boost circuit topology, but such a circuit design is relatively complex, and involves severe electromagnetic interference. Another solution relates to the use of a non-polar capacitor coupled with an alternating-current power supply. However the non-polar capacitor suffers from small capacitance and low driving power due to the limitation of its process and has to be produced with a large size for a better driving effect, thus resulting in a bulky driver which occupies a considerable space and is produced at an increased cost.

SUMMARY

Various embodiments propose a load driver which may achieve at least one of the following effects: a reduced space to be occupied, a lower cost, higher drive power available, easiness to produce, etc.

According to various embodiments, there is provided a load driver coupled with an alternating-current power supply, including a voltage limiting circuit including a first polar capacitor and a second polar capacitor connected in inverse series, which are connected in parallel respectively with first and second current limiting elements, wherein the first and second current limiting elements limit the direction in which current flows so that current flows the different polar capacitors in positive and negative halves of a cycle of the alternating-current power supply.

According to various embodiments, there is provided a luminaire including the foregoing load driver and at least one LED lamp as at least one load of the load driver.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the disclosed embodiments. In the following description, various embodiments described with reference to the following drawings, in which.

DETAILED DESCRIPTION

Figure 1:
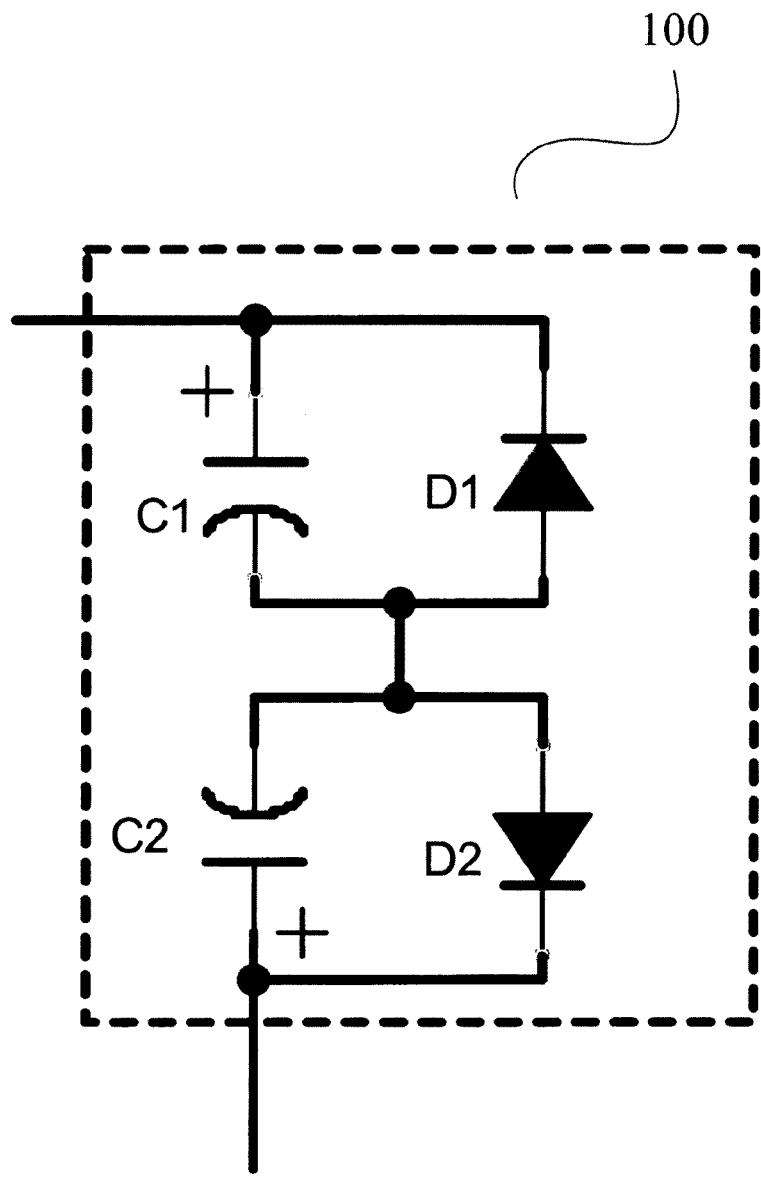
FIG. 1 illustrates a circuit diagram of a load driver 100 according to an embodiment of the present disclosure.

Exemplary embodiments of the present disclosure will be described below in conjunction with the accompanying drawings. For the sake of clarity and conciseness, not all the features of practical implementations have been described in the specification. However it shall be appreciated that numerous implementation-specific decisions shall be made during development of any of such practical implementations in order to achieve a developer's specific goal, and these decisions may vary from one implementation to another. Moreover it shall also be appreciated that such a development effort might be very complex and time-consuming but may simply be a routine task for those skilled in the art benefiting from this disclosure.

An element and a feature described in one of the drawings or implementations can be combined with an element and a feature illustrated in one or more of other drawings or implementations. It shall further be noted that a representation and a description of elements and processes irrelevant to the disclosure and known to those ordinarily skilled in the art have been omitted in the drawings and the description for the sake of clarity.

Furthermore in the instant application a so-called "connection" (including "in parallel", "in series" or other similar terms) encompasses a direct connection or an indirect connection, that is, another element, circuit or module may be present or absent between connected elements, circuits or modules.

FIG. 1 illustrates a circuit diagram of a load driver 100 according to an embodiment of the present disclosure. As illustrated in FIG. 1, the load driver 100 includes a voltage limiting circuit including a first polar capacitor C1 and a second polar capacitor C2 connected in inverse series. The polar capacitor can be an aluminum electrolytic capacitor or a tantalum electrolytic capacitor or another polar capacitor from which those skilled in the art can select as needed in practice, and the present disclosure will not be limited thereto in this regard.

As illustrated in 1, each of the first polar capacitor C1 and a second polar capacitor C2 is connected in parallel with a current limiting element which is illustrated as a diode D1 and a diode D2 in the example of FIG. 1, but it shall be appreciated that the present disclosure will not be limited thereto in this regard, and an example in which another current limiting element than a diode is adopted will be presented later.

In the circuit structure of the load driver 100 illustrated in FIG. 1, current will flow through the capacitor C1 and the diode D2 in a positive half of a cycle and through the capacitor C2 and the diode D1 in a negative half of a cycle of an alternating-current power supply.

Figure 2:
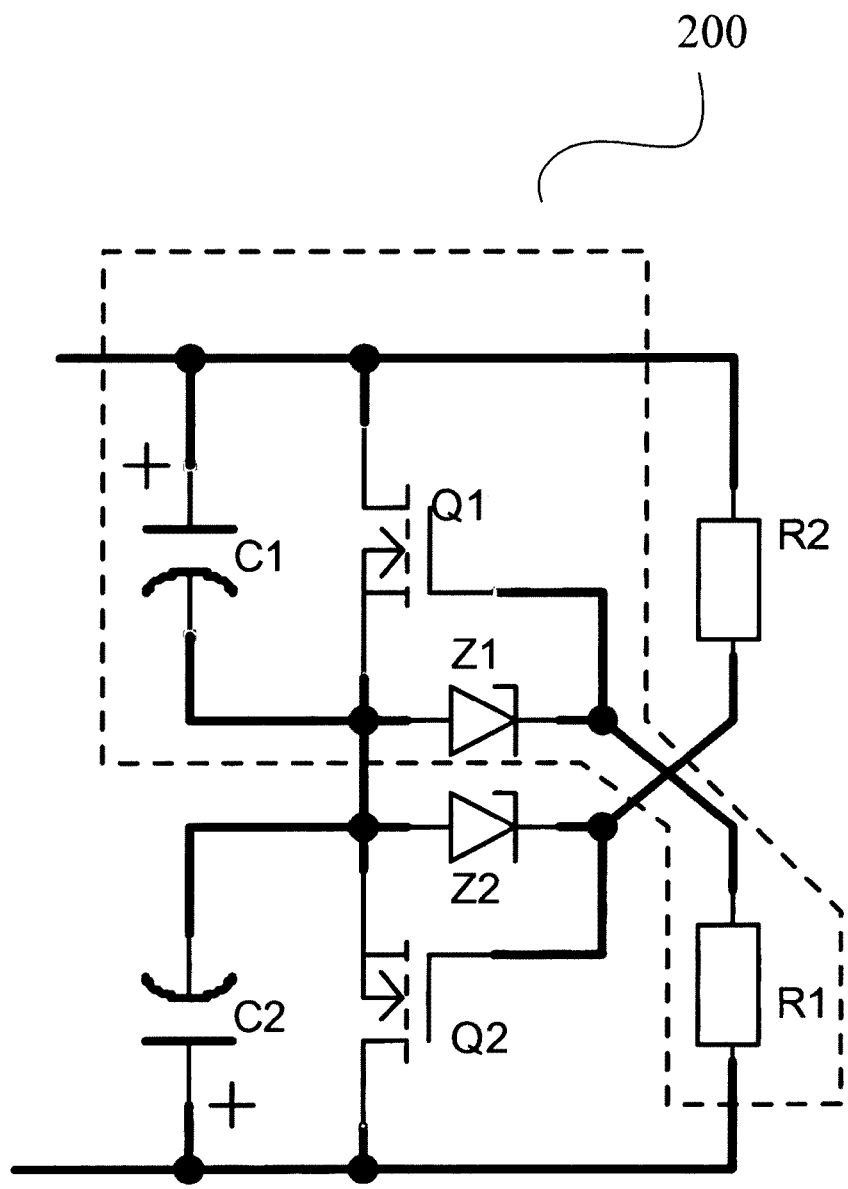
FIG. 2 illustrates a circuit diagram of a load driver 200 according to another embodiment of the present disclosure.

FIG. 2 illustrates an example of a load driver 200 according to another embodiment of the present disclosure. In this example, an N channel MOSFET (simply referred to as MOSFET below) is adopted as an example of a current limiting element. The drain and the source of each MOSFET are connected in parallel across the one of the first and second polar capacitors which is not activated concurrently with the MOSFET. That is, the drain and the source of the MOSFET Q1 are connected in parallel across the capacitor C1, and the drain and the source of the MOSFET Q2 are connected in parallel across the capacitor C2, as illustrated in FIG. 2.

Particularly dependent upon the characteristic of a device, a zener diode can be connected between the gate and the source of an MOSFET for the purpose of clamping to prevent the MOSFET from being blown. Dependent upon the characteristic of a device, driving resistors R1 and R2 can also be connected between the gate of an MOSFET and the positive end of the polar capacitor activated concurrently with the MOSFET. Particularly the resistor R1 controls the MOSFET Q1 to be switched on, and the resistor R2 controls the MOSFET Q2 to be switched on. For example, the resistor R2 controls Q2 to be switched on and current flows through C1 and Q2 in a positive half of a cycle of alternating-current power supply. The resistor R1 controls Q1 to be switched on and current flows through C2 and Q1 in a negative half of a cycle of alternating-current power supply. The magnitudes of resistances of the resistors R1 and R2 can be determined by an input voltage of the alternating-current power supply and the characteristics of a devices in the circuit. The resistors R1 and R2 are connected in a way not limited thereto, but can alternatively be connected between the gate of an MOSFET and the corresponding zener diode, for example. For example the resistor R1 is connected between the gate of the MOSFET Q1 and the zener diode Z1, and alike the resistor R2 is connected between the gate of the MOSFET Q2 and the zener diode Z2. At this time the gate of the MOSFET Q1 is still connected to the positive end of C2 through the resistor R1, and also the gate of the MOSFET Q2 is still connected to the positive end of C1 through the resistor R2. An example of a signal for controlling the gate tapped from the positive end of a capacitor has been presented above. The resistors can be connected in a manner not limited thereto. The signal for controlling the gate can alternatively be tapped from another location of a circuit including a capacitor activated concurrently with a corresponding MOSFET as long as the gate of the MOSFET can be provided with a voltage through the resistors. Of course an MOSFET can alternatively be powered by an external driver through the resistors. The present disclosure will not be limited thereto in this regard.

An example in which a diode and an MOSFET are used as a current limiting element has been presented above, but the present disclosure will not be limited thereto as long as the current limiting element can limit the direction in which current flows so that current will flow through different polar capacitors in positive and negative halves of a cycle of an alternating-current power supply.

The circuits illustrated in FIG. 1 and FIG. 2 can be useful in limiting the voltage of an alternating-current power supply within a range in which a load is operable and therefore can be referred to as a voltage limiting circuit. The load driver can further include a rectifier and filter circuit to rectify and filter a voltage from the voltage limiting circuit to thereby provide a load with rectified and filtered direct current accommodating an illumination demand of the load. Those skilled in the art know how to implement the rectifier and filter circuit, which will not be described in detail.

Figure 3:
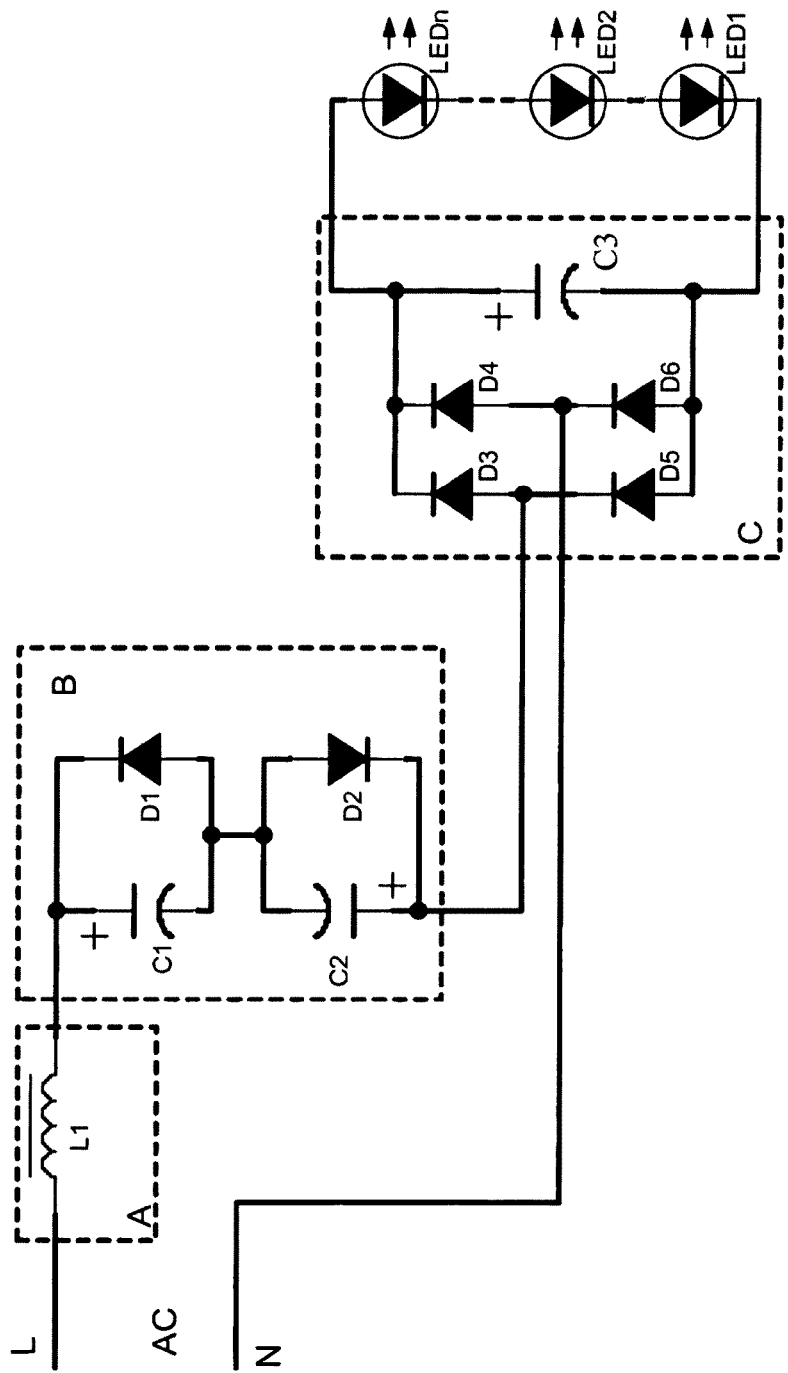
FIG. 3 illustrates an example of applying a load driver according to an embodiment of the present disclosure to a load illumination circuit.

An example of applying the load driver 100 of FIG. 1 to a load illumination circuit will be described below with reference to FIG. 3. As illustrated in FIG. 3, the circuit includes three parts A, B and C. The circuit A corrects a power factor. The circuit B is the voltage limiting circuit described with reference to FIG. 1. The circuit C is a rectifier and filter circuit. LED1 to LEDn are loads to be driven by the load driver. Here an LED light is taken as an example of a load, but the present disclosure will not be limited thereto in this regard, and any load that can be driven by direct current can be an example of a load in an embodiment of the present disclosure.

In a positive half of a cycle of an alternating-current power supply, current flows in the following direction: the L terminal of the alternating-current power supply-L1-C1-D2-D3-the LED light-D6-the N terminal of the alternating-current power supply. In a negative half of a cycle of the alternating-current power supply, current flows in the following direction: the N terminal of the alternating-current power supply-D4-the LED light-D5-C2-D1-L1-the L terminal of the alternating-current power supply.

Figure 4:
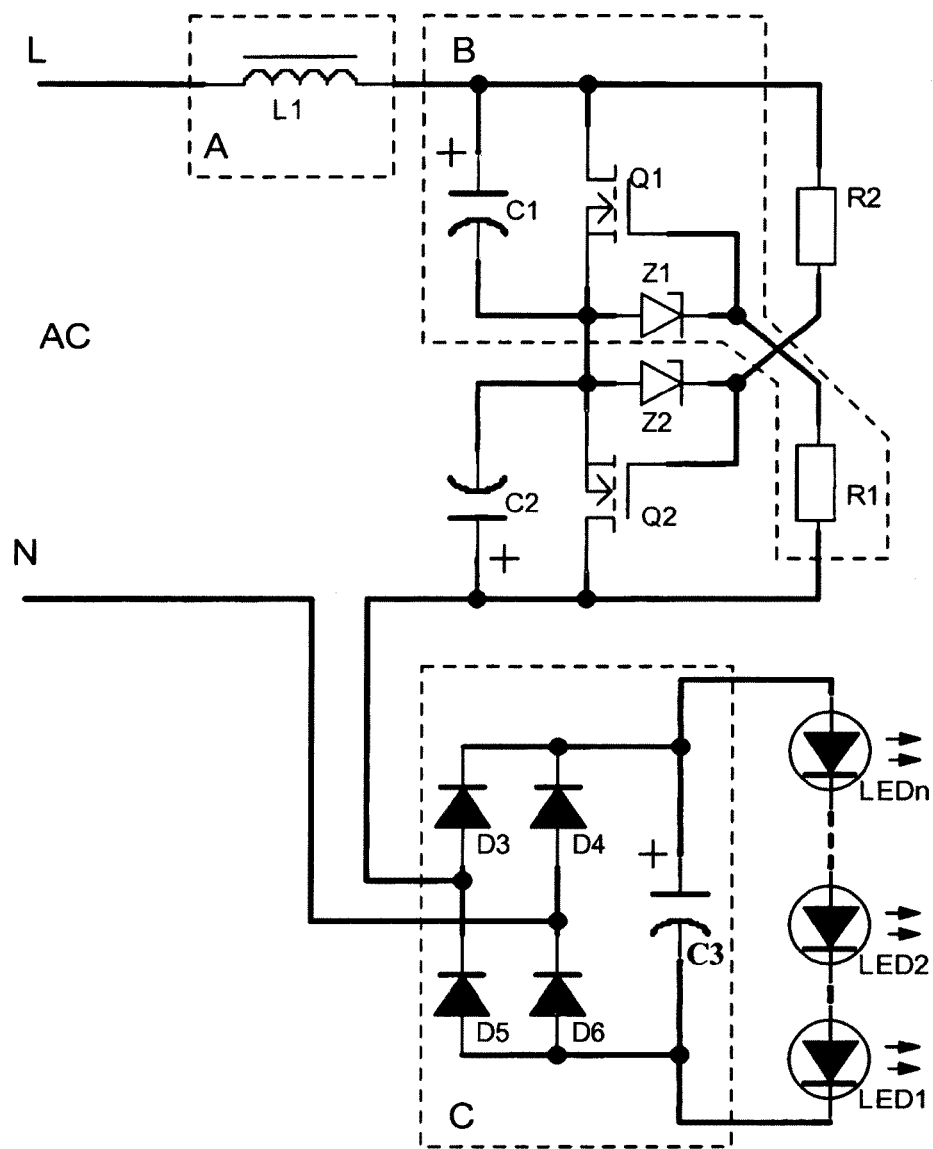
FIG. 4 illustrates another example of applying a load driver according to an embodiment of the present disclosure to a load illumination circuit.

FIG. 4 illustrates an example of applying the load driver 200 of FIG. 2 to a load illumination circuit. As illustrated in FIG. 4, the circuit also includes three parts A, B and C. In a positive half of a cycle of an alternating-current power supply, current flows in the following direction: the L terminal of the alternating-current power supply-L1-C1-Q2-D3-an LED light-D6-the N terminal of the alternating-current power supply. In a negative half of a cycle of the alternating-current power supply, current flows in the following direction: the N terminal of the alternating-current power supply-D4-the LED light-D5-C2-Q1-L1-the L terminal of the alternating-current power supply.

The foregoing driver circuit design has a smaller volume than the BUCK or Boost circuit topology to thereby save a space, and the circuit is simple and easy to produce. A polar capacitor has considerable capacitance and therefore can achieve higher driving power than a non-polar capacitor. Higher driving power can be achieved with a smaller polar capacitor to thereby save a space, and its elements are cheap, thereby saving a cost.

An embodiment of the present disclosure further provides a luminaire including the foregoing load driver and an LED lamp as a load.

While the disclosed embodiments have been particularly shown and described with reference to specific embodiments, it should be understood by those skilled in the art that various changes in form and detail may be made therein without departing from the spirit and scope of the disclosed embodiments as defined by the appended claims. The scope of the disclosed embodiments is thus indicated by the appended claims and all changes which come within the meaning and range of equivalency of the claims are therefore intended to be embraced.

The invention claimed is:

1. A load driver coupled with an alternating-current power supply, comprising a voltage limiting circuit comprising a first polar capacitor and a second polar capacitor connected in inverse series, which are connected in parallel respectively with first and second current limiting elements, wherein at least one of the first current limiting element and the second current limiting element is an MOSFET, and the gate of each MOSFET is connected to a respective driving source, which controls the MOSFET so that the current flows through different polar capacitors in positive and negative halves of a cycle of the alternating-current power supply, wherein the driving source is an external driving source or an internal driving source, wherein the internal driving source comprises a signal for controlling the gate of a respective MOSFET, tapped from a circuit comprising a respective polar capacitor activated concurrently with the MOSFET.

2. The load driver according to claim 1, wherein the gate of each MOSFET is connected to the positive end of the one of the first and second polar capacitors which is activated concurrently with the MOSFET.

3. The load driver according to claim 1, wherein a zener diode is connected between the gate and the source of the MOSFET.

4. The load driver according to claim 1, wherein a driving resistor is connected with the gate of the MOSFET.

5. The load driver according to claim 1, wherein at least one of the first and second polar capacitors is an aluminum electrolytic capacitor or a tantalum electrolytic capacitor.

6. The load driver according to claim 1, further comprising a rectifier and filter circuit connected to the voltage limiting circuit.

7. A luminaire, comprising a load driver and at least one LED lamp as at least one load of the load driver,
the load driver coupled with an alternating-current power supply, comprising a voltage limiting circuit comprising a first polar capacitor and a second polar capacitor connected in inverse series, which are connected in parallel respectively with first and second current limiting elements, wherein at least one of the first current limiting element and the second current limiting element is an MOSFET, and the gate of each MOSFET is connected to a respective driving source, which controls the MOSFET so that the current flows through different polar capacitors in positive and negative halves of a cycle of the alternating-current power supply, wherein the driving source is an external driving source or an internal driving source, wherein the internal driving source comprises a signal for controlling the gate of a respective MOSFET, tapped from a circuit comprising a respective polar capacitor activated concurrently with the MOSFET.

* * * * *